United States Patent

Niessner et al.

Patent Number: 5,972,519
Date of Patent: Oct. 26, 1999

[54] TRANSPARENT ANTIBLOCKING FILM

[75] Inventors: Norbert Niessner, Friedelsheim; Konrad Knoll, Ludwigshafen, both of Germany

[73] Assignee: BASF Aktiengesellschaft, Ludwigshafen, Germany

[21] Appl. No.: 08/983,362

[22] PCT Filed: May 26, 1997

[86] PCT No.: PCT/EP97/02682

§ 371 Date: Jan. 13, 1998

§ 102(e) Date: Jan. 13, 1998

[87] PCT Pub. No.: WO97/46608

PCT Pub. Date: Dec. 11, 1997

[30] Foreign Application Priority Data

May 30, 1996 [DE] Germany ............ 196 21 688

[51] Int. Cl.[6] ............... C08J 5/18; B32B 25/08; C08L 53/02
[52] U.S. Cl. ............ 428/474.4; 428/483; 428/500; 428/516; 428/517; 524/552; 525/316
[58] Field of Search ............... 428/474.4, 483, 428/500, 516, 517; 524/552; 525/316

[56] References Cited

U.S. PATENT DOCUMENTS 4,603,155 7/1986 Muramori et al. ............ 525/314
5,270,388 12/1993 Onishi et al. ............ 525/89
5,545,690 8/1996 Trepka et al. ............ 525/98

FOREIGN PATENT DOCUMENTS 511 127   10/1992  European Pat. Off. .
44 20 952 12/1995  Germany .
19503326  8/1996   Germany .

OTHER PUBLICATIONS

U.S. Serial No. 08/849,918, filed Jun. 18, 1997.
Derwent Publications, Section Ch, Week 7721, Class A12, AN 77–37302Y (Abstract of JP 52 047 849, Apr. 16, 1977).
Derwent Publications, Section Ch, Week 7443, Class A12, AN 74–74873V (Abstract of JP 49 020 254, Feb. 22, 1974).
Derwent Publications, Section Ch, Week 9324, Class A12, AN 93–191645 (Abstract of JP 05 117 492, May. 14, 1993).

Primary Examiner—Jeffrey C. Mullis
Attorney, Agent, or Firm—Keil & Weinkauf

[57] ABSTRACT

A film in roll form, in particular for food packaging as substitute for a film made from polyvinyl chloride, comprises from 15 to 99.6% by weight of an elastomeric styrene-butadiene block copolymer, from 15 to 99.6% of a thermoplastic polymer, from 0.1 to 10% of an antifogging agent, from 0.1 to 5% of a primary antioxidant, from 0.1 to 5% of a secondary antioxidant and from 0.1 to 50% of other auxiliaries, and shrinks perpendicularly to the direction of take-off by not more than 3% during a storage period of three months.

12 Claims, No Drawings

TRANSPARENT ANTIBLOCKING FILM

Transparent, self-adhering gas-permeable stretch films (cling films) are known. They are used in the food packaging sector and are described, for example, in JA-A-76 55 352 and JA-A-74 20 254. The commercially available films are generally composed of PVC, making it difficult to dispose of used films.

FR-A-2 686 887 and FR-A-2 691 436 describe the production of stretch films from a mixture of styrene-butadiene-styrene block copolymers and a styrene-butadiene rubber as soft phase, which may also contain polyisobutylene. These films have good recovery after stretching (memory effect) and can be produced so as to be self-adhering. On the other hand, however, their thermal stability is too low as a result of the high proportion of butadiene; (the entire soft phase is composed of pure polybutadiene). In addition, polybutadiene is easily crosslinked: while a low degree of crosslinking is necessary to achieve the elastomeric behavior of the soft phase, if crosslinking is too extensive the gel fractions formed are seen in practice as fish-eyes. It is therefore difficult to produce a satisfactory film having the right degree of crosslinking.

Because of these disadvantages, films made from ethylene copolymers (mostly having up to about 25% of 1-hexene or 1-octene as comonomers) are therefore increasingly recommended as packaging films. Some commercially available products of this type have excellent thermal stability and are therefore easy to process.

However, because of its molecular structure this class of polymer to a large extent lacks the crosslinking points which are typical of styrene-butadiene-styrene polymers and which make it possible for these polymers to have rubbery thermoplastic behavior, ie. a recovery effect (memory effect) after undergoing stretching.

It is therefore an object of the invention to find a polymer material suitable for the food sector and for producing transparent thin films permeable to gases and combining good cling properties with high optical quality (ie. a low portion of fish-eyes) with, at the same time, very good memory effect. A further object is to avoid the clouding which often occurs with known packaging films which is the result of droplets of water condensed during the storage of foods and probably arises as a result of their non-polar surface whenever there is a marked difference in conditions during packing and storage, especially if packing is carried out at temperatures above the subsequent storage temperature. Finally, a still further problem with known films is their severe tendency to shrink, in particular transversely to the direction of extrusion (transverse shrinkage); this tendency must be kept small so that the required tolerances can be maintained on manual or automatic packing machinery.

We have found that this object is achieved by means of a film which gives only slight clouding as a result of water condensation and which, within three months in usual storage after production, has a transverse shrinkage of less than 3%. The other properties set out above as being desirable are possessed to a high degree by films produced according to the invention, and the films can easily be disposed of after use, since they can be incinerated to give virtually entirely carbon dioxide and water.

The invention provides a transparent polymer mixture in roll form, in particular for the food packaging sector, made from, based on the total weight of P1 to P5, P1: from 15 to 99.6% by weight of an elastomeric block copolymer P1 made from at least one block S which forms a hard phase and incorporates units of a vinylaromatic monomer, and at least one elastomeric block B/S which forms a soft phase and incorporates both units of a vinylaromatic monomer (S) and of a diene (B), where S is the vinylaromatic block and B/S is the soft phase, ie. the block built up randomly from diene units and vinylaromatic units, and where the glass transition temperature $T_g$ of the block S is above 25° C. and that of the block B/S is below 25° C. and the phase volume ratio of block S to block B/S is selected so that the proportion of hard phase in the entire block copolymer is from 1 to 40% by volume and the proportion of the diene is less than 50% by weight, P2: from 15 to 99.6% of a thermoplastic polymer P2,
P3: from 0.1 to 10% of an antifogging agent P3,
P4: from 0.1 to 5% of a primary antioxidant P4,
P5: from 0.1 to 5% of a secondary antioxidant P5 and
P6: from 0.1 to 50% of other auxiliaries, which shrinks perpendicularly to the direction of take-off by not more than 3% during a storage period of three months after production.

Other particularly preferred embodiments of the invention are given in the attached claims and the description below.

An elastomeric block copolymer P1 according to the invention is obtained by forming the soft phase within the definition of the above parameters from a random copolymer of a vinylaromatic compound with a diene; random copolymers of vinylaromatic compounds and dienes are obtained by polymerization in the presence of a polar cosolvent. Further, more detailed information on the preparation of elastomeric block copolymers consisting of or comprising a random copolymer of a vinylaroamtic compound and a diene is given in DE-A-44 20 952.

A block copolymer according to the invention can be represented, for example, by one of the formulae 1 to 12:
(1) S-B/S-S;
(2) $(S-B/S)_n$;
(3) $(S-B/S)_n$-S;
(4) B/S-$(S-B/S)_n$;
(5) $X-[(S-B/S)_n]_{m+1}$;
(6) $X-[(B/S—S)_n]_{m+1}$;
(7) $X-[(S-B/S)_n-S]_{m+1}$;
(8) $X-[(B/S-S)_n-B/S]_{m+1}$;
(9) $Y-[(S-B/S)_n]_{m+1}$;
(10) $Y-[(B/S—S)_n]_{m+1}$;
(11) $Y-[(S-B/S)_n-S]_{m+1}$;
(12) $Y-[(B/S—S)_n-B/S]_{m+1}$;
where S is the vinylaromatic block and B/S is the soft phase, ie. the block built up randomly from diene units and vinylaromatic units, X is the radical of an n-functional initiator, Y is the radical of an m-functional coupling agent and m and n are natural numbers from 1 to 10.

The mixing partner (component P2) of the elastomeric block copolymer P1 according to the invention is, for example, a partially crystalline polymer, preferably selected from the class consisting of partially crystalline polyamides, partially aromatic copolyamides, polyolefins, ionomers, polyesters, polyether ketones, polyoxyalkylenes and polyarylene sulfides.

Polyamides

Partially crystalline, preferably linear polyamides such as nylon-6; nylon-6,6; nylon-4,6 and nylon-6,12, and partially crystalline copolyamides based on these components are suitable. It is moreover possible to employ partially crystalline polyamides whose acid component consists of or comprises adipic acid and/or terephthalic acid and/or isophthalic acid and/or suberic acid and/or sebacic acid and/or azelaic acid and/or dodecanedicarboxylic acid and/or a cyclohexanedicarboxylic acid, and whose diamine component consists of or comprises, in particular, m- and/or p-xylylenediamine and/or hexamethylenediamine and/or 2,2,4- and/or 2,4,4-trimethylhexamethylenediamine and/or isophoronediamine, and whose compositions are known in principle (cf. Encyclopedia of Polymers, Vol. 11, pp. 315 ff.).

The molecular weights $M_n$ (number average) of the polyamides suitable as component P2 are preferably in the range from 5000 to 100,000, particularly preferably from 10,000 to 80,000.

Suitable polyamides are partially crystalline, linear polyamides, for example having a relative viscosity of from 2.2 to 4.5 (measured in 96% strength by weight sulfuric acid at a concentration of 1 g/100 ml at 23° C.). Preference is given to polyamides derived partly or entirely from lactams having from 7 to 13 ring members, such as polycaprolactam, polycaprylolactam or polylaurolactam.

Other suitable polyamides are those obtained by reacting dicarboxylic acids with one or more diamines. Examples of suitable dicarboxylic acids are alkanedicarboxylic acids having from 6 to 12, in particular from 6 to 10, carbon atoms, in particlar adipic acid. Examples of suitable diamines are alkanediamines and cycloalkanediamines having from 4 to 12, in particular from 4 to 8, carbon atoms; particularly suitable partners for the preparation of these polyamides are hexamethylenediamine, m-xylylenediamine, bis(4-aminophenyl)methane, bis(4-aminocyclohexyl) methane and 2,2-bis(4-aminophenyl)propane and mixtures thereof. It may be advantageous to prepare the abovementioned polyamides individually and to use their mixtures.

Of particular industrial importance are nylon-6 (polycaprolactam), nylon-6,6 (polyhexamethyleneadipamide) and polyamides built up to an extent of at least 80% by weight from recurring units of the formula $-[-NH-(CH_2)_4-NH-CO-(CH_2)_4-CO-]-$. The last-mentioned polyamides are obtained by condensation of 1,4-diaminobutane with adipic acid. Suitable processes for the preparation of polyamides are described, for example, in EP-A-38 094, EP-A-38 582 and EP-A-39 524.

Also suitable are polyamides having a low content, preferably up to about 10% by weight, of other co-condensable constituents, in particular other amide-formers, for example alpha, ω-amino acids or N-carboxylic anhydrides (Leuchs anhydrides) of amino acids.

In a preferred embodiment of the invention, the molding compositions according to the invention contain, as component P2, a partially aromatic copolyamide having the structure described below.

Preferred partially aromatic copolyamides P2 contain, as component $b_1$: from 40 to 90% by weight of units derived from terephthalic acid and hexamethylenediamine. A small proportion of terephthalic acid, preferably not more than 10% by weight of the total amount of aromatic dicarboxylic acids employed, may be replaced by isophthalic acid or other aromatic dicarboxylic acids, preferably those in which the carboxyl groups are in para positions.

Besides the units derived from terephthalic acid and hexamethylenediamine, the partially aromatic copolyamides contain units derived from ε-caprolactam ($b_2$) and/or units derived from adipic acid and hexamethylenediamine ($b_3$).

The proportion of units derived from ε-caprolactam is up to 50% by weight, preferably from 20 to 50% by weight, in particular from 25 to 40% by weight, while the proportion of units derived from adipic acid and hexamethylenediamine is up to 60% by weight, preferably from 30 to 60% by weight, in particular from 35 to 55% by weight.

The copolyamides may contain both units of ε-caprolactam and units of adipic acid and hexamethylenediamine; in this case, the proportion of units containing no aromatic groups is preferably at least 10% by weight, preferably at least 20% by weight. The ratio of units derived from ε-caprolactam and those derived from adipic acid and hexamethylenediamine is not subject to any particular restriction.

The melting point of particularly suitable partially aromatic copolyamides is, for example, in the range from 260 to above 300° C., this high melting point also being associated with a high glass transition temperature, generally of above 75° C., in particular above 85° C.

Binary copolyamides based on terephthalic acid, hexamethylenediamine and ε-caprolactam with a content of about 70% by weight of units derived from terephthalic acid and hexamethylenediamine have a melting point in the region of 300° C. and a glass transition temeprature of above 110° C.

Binary copolyamides based on terephthalic acid, adipic acid and hexamethylenediamine achieve a melting point of 300° C. or above even with a content of about 55% by weight of units of terephthalic acid and hexamethylenediamine, although the glass transition temperature is not as high as for binary copolyamides containing ε-caprolactam instead of adipic acid or adipic acid/hexamethylenediamine.

Suitable partially aromatic copolyamides can be prepared by the processes described in EP-A-129 195 and EP-A-129 196.

Component P2 according to the invention may furthermore be an amorphous polyamide. Using the abovementioned monomers as a basis, additional monomers, frequently provided with one or more side groups which hinder crystallization, are also included in the condensation. The result is generally a transparent polyamide.

Polyolefins

Other examples of polymers which are suitable as component P2 of the molding compositions according to the invention are partially crystalline polyolefins, preferably homopolymers or copolymers of olefins such as ethylene, propylene, 1-butene, 1-pentene, 1-hexene, 1-heptene, 3-methyl-1-butene, 4-methyl-1-butene, 4-methyl-1-pentene and 1-octene. Accordingly, examples of suitable polyolefines are polyethylene, polypropylene, poly-1-butene and poly-4-methyl-1-pentene. A distinction is generally drawn in the case of polyethylene (PE) between high density PE (HDPE), low density PE (LDPE) and linear low density PE (LLDPE).

Preferred polyolefins suitable as component P2 are polyethylene, polypropylene and poly-4-methyl-1-pentene, particularly preferably polyethylene and polypropylene. In addition to the olefins, the polyolefins may also contain minor amounts of other monomers. Particularly suitable polyolefins are, for example, ethylene-octene copolymers and ethylene-hexene copolymers having a high content of octene and hexene respectively (for example the commercial products Affinity® or Engage® from DOW Chemical Co.)

Ionomers

In another embodiment of the invention, component P2 is an ionomer, generally a polyolefin as described above, in particular polyethylene, incorporating monomers having carboxyl groups, for example acrylic acid, methacrylic acid and, if desired, other copolymerizable monomers. The acid groups are generally converted with the aid of metal ions, for example Na, Ca, Mg or Al ions, into ionic, possibly ionically crosslinked polyolefins, which, however, can still be processed as thermoplastics (cf. for example U.S. Pat. Nos.

3,264,272, 3,404,134, 3,355,319 and 4,321,337). However, it is not absolutely necessary to convert the polyolefins containing acid groups by using metal ions. Polyolefins containing free acid groups, which then generally have a rubbery character and in some cases also contain other copolymerizable monomers, for example (meth)acrylates, are also suitable as component P2 according to the invention.

Polyesters

In addition, component P2 can also be a polyester, preferably an aromatic-aliphatic polyester. Examples are polyalkylene terephthalates, for example those based on ethylene glycol, 1,3-propanediol, 1,4-butanediol, 1,6-hexanediol or 1,4-bis(hydroxymethyl)cyclohexane, and polyalkylene naphthalates, such as polyethylene naphthalate and polybutylene naphthalate. Preference is given to polyethylene terephalate, polybutylene terephthalate and copolymers of cyclohexane-1,4-dimethanol, ethylene glycol and terephthalic acid. Particular preference is given to polybutylene terephthalate. The molecular weight (weight average, Mw) of suitable polyalkylene terephthalates is generally from 10,000 to 500,000, preferably from 10,000 to 80,000. Their preparation, for example by transesterification, is described, for example, in U.S. Pat. Nos. 2,647,885, 2,643,989 and 2,534,028.

Polyether ketones

Component P2 may moreover be an aromatic polyether ketone, as described, for example, in British Patent 1 078 234, U.S. Pat. No. 4,010,147, EP-A-135 938 and the publication by C. K. Sham et. al., Polymer 29/6, 1016–1020 (1988). These polyether ketones can be obtained by reacting bisphenols with bis(haloaryl) ketones in polar aprotic solvents in the presence of alkali metal carbonates, for example lithium carbonate. A typical reaction product of this type is, for example, the product formed from hydroquinone and 4,4'-difluorobenzophenone.

Polyoxyalkylenes

Component P2 of the molding compositions according to the invention may moreover be a polyoxymethylene, ie. a polyoxyalkylene containing at least 50 mol % of recurring —$CH_2O$— units in the main polymer chain. The preparation of these compounds is well known: the homopolymers are generally prepared by polymerization of formaldehyde or trioxane in the presence of suitable catalysts. Preference is given to oxymethylene copolymers containing, in addition to the recurring —$CH_2O$— units, up to 50 mol %, preferably from 0.1 to 20 mol %, in particular from 0.3 to 10 mol %, of recurring units of the structure (I)

$$—O—C(R^1,R^2)—C(R^3,R^4)—(R^5)_n— \quad (I)$$

where $R^1$ to $R^4$, independently of one another, are hydrogen or $C_1$–$C_4$-alkyl and $R^5$ is —$CH_2$—, —$CH_2O$—, or a methylene or oxymethylene group which is substituted with $C_1$–$C_4$-alkyl or $C_1$–$C_4$-haloalkyl, and n is 0 or an integer from 1 to 3.

Examples of suitable modifying components for the abovementioned polyoxyalkylenes are cyclic ethers, such as ethylene oxide, 1,2-propylene oxide, 1,2-butylene oxide, 1,3-butylene oxide, 1,3-dioxane, 1,3-dioxolane and 1,3-dioxepan, and linear oligoformals and polyformals, such as polydioxolane and polydioxepan.

Other suitable components P2 are oxymethylene terpolymers prepared, for example, by reacting trioxane, one of the cyclic ethers described above and a third monomer, preferably a diepoxide of the formula (II)

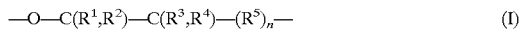

Glycidyl—$CH_2$—Z—$CH_2$—Glycidyl (II)

where Z is a single bond or one of the divalent radicals —O—, —$C_1$-$C_8$-alkylene and —$C_3$-$C_8$-cycloalkylene.

Preferred monomers of this type are ethylene diglycide, diglycidyl ether and diglycidyl formal, dioxane and trioxane in a molar ratio of 2:1, and diethers made from 2 mol of a glycidyl radical and 1 mol of an aliphatic diol having from 2–8 carbon atoms, for example the diglycidyl ethers of ethylene glycol, 1,2-propanediol, 1,4-butanediol, cyclobutane-1,3-diol and cyclohexane-1,4-diol.

Preferred oxymethylene copolymers have a melting point of at least 150° C. and a molecular weight (weight average $M_w$) in the range from 5000 to 150,000, preferably from 7000 to 100,000. End-group-stabilized oxymethylene polymers containing C—C bonds at the chain ends are particularly preferred.

Polyarylene Sulfides

Component P2 may moreover be a polyarylene sulfide, in particular polyphenylene sulfide. The preparation of the latter is described, for example, in U.S. Pat. Nos. 3,354,129, 3,786,035 and EP-A-171 021.

Polyurethanes

Component P2 of the thermoplastic molding compositions according to the invention can also be a thermoplastic polyurethane. Thermoplastic polyurethanes and processes for their preparation are known and are described, for example, in DE-A-36 28 562.

Suitable thermoplastic polyurethanes can be prepared, for example, by reacting organic, preferably aromatic diisocyanates, polyhydroxyl compounds having a weight-average molecular weight ($M_w$) of from 500 to 8000 and chain extenders having an $M_w$ of from 60 to 400.

Examples of suitable organic diisocyanates are aliphatic, cycloaliphatic and preferably aromatic diisocyanates. Specific mention may be made of aliphatic diisocyanates, such as hexamethylene diisocyanate, cycloaliphatic diisocyanates, such as isophorone diisocyanate, 1,4-cyclohexane diisocyanate, 1-methyl-2,4-cyclohexane diisocyanate and 2,6-cyclohexane diisocyanate, and the corresponding isomer mixtures, 4,4'-, 2,4'- and 2,2'-dicyclohexylmethane diisocyanate and the corresponding isomer mixtures, and preferably aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'- and 4,4'-diphenylmethane diisocyanate, urethane-modified, liquid 4,4'- and/or 2,4'-diphenylmethane diisocyanates, 1,2-bis(4-isocyanatophenyl)ethane and 1,5-naphthylene diisocyanate. Preference is given to hexamethylene diisocyanate, isophorone diisocyanate, 1,5-naphthylene diisocyanate and to diphenylmethane diisocyanate isomer mixtures containing at least 96% by weight of 4,4'-diphenylmethane diisocyanate.

Suitable high-molecular-weight polyhydroxyl compounds having molecular weights of from 500 to 8000 are preferably polyetherols and polyesterols. Also suitable, however, are hydroxyl-containing polymers, for example polyacetals, such as polyoxymethylenes and in particular water-insoluble formals, for example polybutanediol formal and polyhexanediol formal, and polycarbonates, in particular those prepared by transesterification from diphenyl carbonate and 1,6-hexanediol and having the abovementioned molecular weights. The polyhydroxyl compounds must have an at least predominantly linear structure, ie. must be bifunctional for the purposes of the isocyanate reaction. The polyhydroxyl compounds mentioned can be used as individual components or mixtures.

Suitable polyetherols can be prepared by reacting one or more alkylene oxides having from 2 to 4 carbon atoms in the

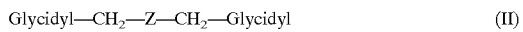

alkylene radical with a starter molecule whose structure contains two active hydrogen atoms. Examples of suitable alkylene oxides are ethylene oxide, 1,2-propylene oxide and 1,2- and 2,3-butylene oxide. Preference is given to ethylene oxide and mixtures of 1,2-propylene oxide and ethylene oxide. The alkylene oxides may be used individually, alternately one after the other or as a mixture. Examples of suitable starter molecules are water, amino alcohols, such as N-alkyldiethanolamines (for example N-methyldiethanolamine), and diols, such as ethylene glycol, 1,3-propylene glycol, 1,4-butanediol and 1,6-hexanediol. It is also possible to use mixtures of starter molecules. Other suitable polyetherols are the hydroxyl-containing products of the polymerization of tetrahydrofuran (polyoxytetramethylene glycols).

Preference is given to polyetherols made from 1,2-propylene oxide and ethylene oxide and in which more than 50%, preferably from 60 to 80%, of the OH groups are primary hydroxyl groups, and in which at least some of the ethylene oxide is in the form of a terminal block, and in particular to polyoxytetramethylene glycols.

Such polyetherols can be obtained by, for example, polymerizing firstly 1,2-propylene oxide and then ethylene oxide onto a starter molecule or firstly copolymerizing all the propylene oxide mixed with some of the ethylene oxide and then polymerizing onto this the remainder of the ethylene oxide, or stepwise by firstly polymerizing some of the ethylene oxide then all of the propylene oxide and then the remainder of the ethylene oxide onto the starter molecule.

The linear polyetherols which are most important for the invention have a molecular weight $M_w$ of from 500 to 8000, preferably from 600 to 6000, in particular from 800 to 3500. They may be used either individually or as mixtures with one another.

Suitable polyesterols can be prepared, for example, from dicarboxylic acids having from 2 to 12 carbon atoms, preferably from 4 to 8 carbon atoms, and polyhydric alcohols. Examples of suitable dicarboxylic acids are aliphatic dicarboxylic acids, such as succinic acid, glutaric acid, adipic acid, suberic acid, azelaic acid and sebacic acid, and aromtic dicarboxylic acids, such as phthalic acid, isophthalic acid and terephthalic acid. The dicarboxylic acids can be used individually or as mixtures, for example in the form of a mixture of succinic acid, glutaric acid and adipic acid. It is also possible to use mixtures of aromatic and aliphatic dicarboxylic acids. It may be advantageous for the preparation of the polyesterols to replace the dicarboxylic acids with the corresponding dicarboxylic acid derivatives, such as dicarboxylic esters having from 1 to 4 carbon atoms in the alcohol radical, dicarboxylic anhydrides or dicarboxylic acid chlorides. Examples of polyhydric alcohols are glycols having from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the properties desired, the polyhydric alcohols can be used alone or, if desired, in mixtures with one another.

Other suitable compounds are esters of carbonic acid with the abovementioned diols, in particular those having from 4 to 6 carbon atoms, such as 1,4-butanediol and/or 1,6-hexanediol, products of the condensation of ω-hydroxycarboxylic acids, for example ω-hydroxycaproic acid, and preferably products of the polymerization of lactones, for example substituted or unsubstituted ω-caprolactones.

The polyesterols preferably used are dialkylene glycol polyadipates having from 2 to 6 carbon atoms in the alkylene radical, for example ethanediol polyadipate, 1,4-butanediol polyadipate, ethanediol 1,4-butanediol polyadipate, 1,6-hexanediol neopentyl glycol polyadipate, polycaprolactone and in particular 1,6-hexanediol 1,4-butanediol polyadipate.

Suitable polyesterols have, for example, a molecular weight $M_w$ of from 500 to 6000, preferably from 800 to 3500.

Preferred chain extenders having a molecular weight $M_w$ of from 60 to 400, preferably from 60 to 300, are aliphatic diols having from 2 to 12 carbon atoms, preferably having 2, 4 or 6 carbon atoms, for example ethanediol, 1,6-hexanediol, diethylene glycol, dipropylene glycol and in particular 1,4-butanediol. Other suitable compounds, however, are diesters of terephthalic acid with glycols having from 2 to 4 carbon atoms, for example bis(ethylene glycol) or bis(1,4-butanediol) terephthalate, hydroxyalkylene ethers of hydroquinone, for example 1,4-di(β-hydroxyethyl)hydroquinone, (cyclo)aliphatic diamines, for example 4,4'-diaminodicyclohexylmethane, 3,3'-dimethyl-4,4'-diaminodicyclohexylmethane, isophoronediamine, ethylenediamine, 1,2- and 1,3-propylenediamine, N-methyl-1,3-propylenediamine, N,N'-dimethylethylenediamine, and aromatic diamines, for example 2,4- and 2,6-tolylenediamine, 3,5-diethyl-2,4- and -2,6-tolylenediamine, and primary ortho-, di-, tri- and/or tetraalkyl-substituted 4,4'-diaminodiphenylmethanes.

In order to adjust the hardness and melting point of the thermoplastic polyurethanes, the molar ratio between the polyhydroxyl(diol) compounds and the chain extenders can be varied within a relatively broad range. A successful molar ratio between the polyhydroxyl compound and the chain extender has proved to be from 1:1 to 1:12, in particular from 1:1.8 to 1:6.4. The hardness and melting point of the thermoplastic polyurethanes increase with the content of polyhydroxyl compound.

In order to prepare the thermoplastic polyurethanes, the formative components are reacted in such amounts that the ratio between the number of equivalents of NCO groups in the diisocyanates and the total number of hydroxyl groups or hydroxyl and amino groups in the polyhydroxyl compounds and chain extenders is from 1:0.85 to 1:1.20, preferably from 1:0.95 to 1:1.05, in particular from 1:0.98 to 1:1.02.

Suitable catalysts which accelerate, in particular, the reaction between the NCO groups of the diisocyanates and the hydroxyl groups of the polyhydroxyl compounds and chain extenders are the known and conventional tertiary amines, for example triethylamine, dimethylcyclohexylamine, N-methylmorpholine, N,N'-dimethylpiperazine, 2-(dimethylaminoethoxy)ethanol, diazabicyclo[2.2.2]octane (DABCO) and the like, and, in particular, organometallic compounds, such as titanic acid esters, iron compounds, for example iron(III) acetylacetonate, tin compounds, for example tin diacetate, tin dioctanoate, tin dilaurate and the dialkyltin salts of aliphatic carboxylic acids, such as dibutyltin diacetate, dibutyltin dilaurate and the like. The catalysts are usually employed in amounts of from 0.001 to 0.1 part per 100 parts of polyhydroxyl compound.

Other Thermoplastics

Other suitable components P2 are liquid-crystalline polyarylates (LCPs), linear polyimides, polybenzimidazoles, polyhydantoins, polypyrroles, polyphosphazenes and silicones and, for example, non-crystalline polymers based on acrylates or styrene.

Component P2

Component P2 of the mixture according to the invention may also particularly advantageously be a non-crystalline copolymer, such as a methacrylate-acrylate-styrene polymer, an acrylonitrile-butadiene-styrene polymer (ABS), an acrylonitrile-styrene-acrylate polymer (ASA), a methacrylate-butadiene-styrene polymer (MBS), an impact-modified polystyrene (HIPS), or else a homopolymer such as polystyrene, polymethyl methacrylate (PMMA), polyacrylonitrile or polymethacrylimide. Such polymers consist, for example in the case of ABS, ASA, MBS and also in the case of impact-modified polystyrene, of two phases, a continuous phase (often termed hard phase or matrix) and a disperse phase (mostly termed rubber or soft phase). In the single-phase polymers, the disperse, soft rubber phase is generally absent. Components P2 according to the invention are therefore single-phase polymers consisting only of hard phase (such as polystyrene or PMMA), two-phase polymers (eg. ABS, ASA, MBS and impact-modified polystyrene) and also the soft phases alone (eg. the rubber present in ABS, ASA, MBS and impact-modified polystyrene) in ungrafted, grafted, pure or enriched form.

Impact-modified polystyrenes according to the invention and standard polystyrenes, and their preparation, structure and properties, are described in detail in the review literature (A. Echte, F. Haaf, J. Hambrecht in: Angew. Chem. (Int. Ed. Engl.) 20, 344–361, (1981); and Kunststoffhandbuch, Band Polystyrol, Carl Hanser Verlag (1968). The impact-modified polystyrenes used may moreover have a structure which is different from that of conventional impact-modified polystyrene, for example as a result of using specific polybutadiene rubbers. Such specific polybutadiene rubbers have, for example, a 1,4-cis and 1,4-trans proportion different from that of conventional rubbers or a different ratio of 1,2- and 1,4-linkages. Instead of polybutadiene rubber, it is moreover also possible to use other diene rubbers and elastomers of ethylene-propylene-diene copolymer (EPDM rubber) type and hydrogenated diene rubbers. Suitable standard polystyrene may be prepared either by anionic polymerization or by conventional free-radical polymerization. The inhomogeneity of the polymer, which can be influenced by the polymerization process, is of subordinate significance here. Preference is given to standard polystyrene and to impact-modified polystyrene, the toluene-soluble fraction of each of which has an average molecular weight $M_w$ of from 50,000 to 500,000 g/mol and which, if desired, are also provided with additives, such as mineral oil, stabilizer, antistats, flame retardants or waxes.

Examples of suitable monomers for forming the hard phase may be selected from those listed below: styrene and its substituted derivatives, such as α-methylstyrene, 4-methylstyrene, 3,4-dimethylstyrene, 4-tert-butylstyrene, 2- and 4-divinylbenzene and 4-methyl-α-methylstyrene. Other technically suitable compounds would be halogenated styrenes, such as a-chlorostyrene, 4-chlorostyrene, 2,4-dichlorostyrene and 4-chloro-α-methylstyrene, but these are of less interest for practical reasons. Styrene and a-methylstyrene are preferred.

For the purposes of the invention, acrylic and methacrylic compounds are monomers such as acrylonitrile, methacrylonitrile, acrylic and methacrylic acids, methyl acrylate, ethyl acrylate, n-propyl and isopropyl acrylates, n-butyl and isobutyl acrylates, tert-butyl acrylate, 2-ethylhexyl acrylate, methyl methacrylate, ethyl methacrylate, n-propyl and isopropyl methacrylates, n-butyl and isobutyl methacrylates, tert-butyl methacrylate, cyclohexyl methacrylate, isobornyl methacrylate, maleic anhydride and its derivatives, such as maleic esters and maleic diesters and maleimides, eg. alkyl- and arylmaleimides, for example methyl- and phenylmaleimide, preference being given to acrylonitrile, methyl methacrylate, maleic anhydride and phenylmaleimide.

Examples of suitable homo- or copolymers are polystyrene, polymethyl methacrylate, styrene-acrylonitrile copolymers, α-methylstyrene-acrylonitrile copolymers, styrene-maleic anhydride copolymers, styrene-phenylmaleimide copolymers, styrene-methyl methacrylate copolymers, methyl methacrylate-acrylonitrile copolymers, styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers and styrene-acrylonitril-tert-butyl methacrylate copolymers.

Polycarbonate

Components P2 according to the invention may also, for example, be polycarbonate or mixtures of polycarbonate with a number of the graft copolymers and thermoplastics described below. The proportion of polycarbonate here is preferably from 5 to 95% by weight and the proportion of components B1+B2 is preferably from 5 to 95% by weight. Mixtures of this type are now marketed, for example under the trade name Bayblend (Bayer) or Terblend S (BASF). They are mixtures of a polycarbonate with an ABS and/or ASA polymer.

Examples of polycarbonates are those based on diphenols of the structure HO—Ar—X—Ar—OH, where Ar is arylene (phenylene, alkylphenylene, halo-substituted arylene) and X is a single bond, $C_1$–$C_3$-alkylene, $C_2$–$C_3$-alkylidene or $C_3$–$C_6$-cycloalkylidene, or —S— or —$SO_2$—.

Examples of preferred diphenols of the abovementioned structure are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane. These are known compounds, which can be used alone or in a mixture for preparing the polycarbonates.

Suitable polycarbonates may be branched in a known manner, preferably by incorporating from 0.05 to 2.0 mol %, based on the total of the diphenols used, of compounds which are at least trifunctional, for example those having three or more phenolic OH groups.

Polycarbonates which have proven particularly suitable are those which have a relative viscosity nrel of from 1.10 to 1.50, in particular from 1.25 to 1.40. This corresponds to an average molecular weight Mw of from 10,000 to 200,000, preferably from 20,000 to 80,000.

It is also possible for polycarbonate-polysiloxane block copolymers, polycarbonate-polyether block copolymers and polycarbonate-polyester block copolymers to serve as polycarbonates P2 in the broader sense.

Other Thermoplastics of Polycarbonate Type

Other thermoplastics P2 which can be used according to the invention are aromatic polyesters and polyestercarbonates. They are prepared from at least one aromatic bisphenol of the formula (I), of at least one aromatic dicarboxylic acid and, if desired, of carbonic acid and/or its derivatives, such as phosgene and dialkyl and diaryl carbonate. Examples of suitable aromatic dicarboxylic acids are orthophthalic acid, terephthalic acid, isophthalic acid, tert-butylisophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane and trimethyl-3-phenylindane-4,5-dicarboxylic acid.

Irrespective of the objective stated above of creating PVC-free films, it should be pointed out that, using the specific block copolymers P1, it is also possible for specific purposes to prepare mixtures having a hard component which comprises halogenated polymers, such as polyvinylidene chloride or polyvinyl chloride (PVC). PVC is preferably used in modified form. Modification is carried out using low-molecular-weight plasticizers (eg. dioctyl phthalate and dioctyl adipate) and/or polymeric compounds. Mixtures of PVC with plasticizers generally also contain processing stabilizers.

PVC which can be processed without plasticizer is preferably prepared by (suspension) graft polymerization of vinyl chloride onto an elastomer. The elastomer can be composed of polybutadiene rubber and/or polyacrylate rubber.

Other materials which may be used are: chlorinated polyethylene, chlorinated polypropylene, polyisobutylene, polyvinyl acetate, polyvinyl alcohol, polyvinyl ether, polymethylpentene, polytetrafluoroethylene, tetrafluoroethylene-perfluoropropylene copolymers, copolymers of tetrafluoroethylene and perfluoro(alkyl vinyl ether), ethylene-tetrafluoroethylene copolymers, polyvinylidene fluoride, polyvinyl fluoride, polychlorotrifluoroethylene and ethylene-chlorotrifluoroethylene copolymers.

Cellulose Derivatives

Other materials suitable as P2 are cellulose derivatives, such as cellulose acetate, cellulose propionate and cellulose acetobutyrate.

Polyphenylene Ethers

Polyphenylene ethers having the known structural building block —O—$C_6H_4(CH_3)_2$— are suitable as component P2. They are preferably prepared by oxidative polymerization with copper catalysis, or else from the corresponding 2,6-dimethyl-4-halophenols by halogen-substitution reactions. They can be mixed homogeneously with polystyrene and can be mixed very well to homogeneously with the thermoplastic elastomers according to the invention. They may be used in unmodified or modified (eg. with impact-modified polystyrene and/or styrene-butadiene block rubbers) form. Component P2 may, of course, also be polymers which are structurally similar to component P1, for example linear and/or star-shaped styrene-butadiene block copolymer materials, such as Styrolux® (BASF), K-Resin® (Phillips Petroleum) or Finaclear® (Petrofina).

Other polymers which have proven suitable are those which are based on the abovementioned structures (formulae 1 to 12) and have a particularly long polystyrene block S and therefore can serve in a sense as a compatibilizer between component P1 and, for example, the abovementioned linear and/or star-shaped styrene-butadiene block copolymer materials and polystyrenes (glass clear or impact-modified), etc.

The Soft Phase

The soft phase may be the appropriate conventional rubbers, for example natural rubber, epichlorohydrin rubbers, ethylene-vinyl acetate rubbers, polyethylene chlorosulfone rubbers, silicone rubbers, polyether rubbers, diene rubbers, hydrogenated diene rubbers, polyalkeneamer rubbers, acrylate rubbers, ethylene-propylene rubbers, ethylene-propylene-diene rubbers, butyl rubbers and fluororubbers. Preference is given to acrylate rubber, ethylene-propylene (EP) rubber, ethylene-propylene-diene (EPDM) rubber, in particular butadiene-isoprene rubber, diene rubber and silicone rubber.

The acrylate rubbers are generally alkyl acrylate rubbers made from one or more $C_4$–$C_8$-alkyl acrylates, preferably by using at least some butyl, hexyl, octyl or 2-ethylhexyl acrylate. These alkyl acrylate rubbers may incorporate up to 30% by weight of monomers which form hard polymers, for example vinyl acetate, (meth)acrylonitrile, styrene, substituted styrene, methyl methacrylate and vinyl ethers. The acrylate rubbers further contain up to 10% by weight, preferably from 1 to 5% by weight, of polyfunctional monomers with crosslinking action (crosslinking monomers), for example monomers which contain two or more double bonds capable of copolymerization.

Examples of diene rubbers are homopolymers of conjugated dienes having from 4 to 8 carbon atoms, such as butadiene, isoprene, piperylene and chloroprene, copolymers of dienes of this type with one another and copolymers of dienes of this type with styrene compounds, acrylic compounds or methacrylic compounds (eg. acrylonitrile, methacrylonitrile, acrylic acid, methacrylic acid, butyl acrylate, ethylbexyl acrylate and methyl methacrylate). Diene rubbers which are particularly preferred are commercially available butadiene rubbers, butadiene-styrene rubbers, butadiene-methyl methacrylate rubbers, butadiene-butyl acrylate and butadiene-acrylonitrile rubbers (eg. Cariflex® (Shell), Finaprene® (Petrofina), TufpreneS (Asahi); flex® (Shell), Finaprene® (Petrofina), TufpreneS (Asahi); Exxellor® (Exxon); Europrene® (Enichem) etc. There is no particular significance in the selection or sequence of the products mentioned; the company names are abbreviated).

Examples of suitable silicone rubbers are crosslinked silicone rubbers made from units of the formulae $R_2SiO$, $RSiO_{3/2}$, $R_3SiO_{1/2}$ and $SiO_{2/4}$, R being a monovalent radical. The amount of the individual siloxane units here is adjusted so that for each 100 units of the formula $R_2SiO$, there are up to 10 mol units of the formula $RSiO_{3/2}$, up to 1.5 mol units of $R_3SiO_{1/2}$ and up to 3 mol units of $SiO_{2/4}$. R here may either be a monovalent saturated hydrocarbon radical having from 1 to 18 carbon atoms, phenyl, alkoxy or a group, such as vinyl or mercaptopropyl, which is very susceptible to free-radical attack. It is preferable for at least 80% of all of the radicals R to be methyl; combinations of methyl and ethyl or phenyl are particularly preferred.

The soft component may also be a polymer built up in more than one step (with core-shell morphology). For example, an elastomeric core (glass transition temperature $T_g<0°$ C.) may be encompassed by a hard shell (glass transition temperature $T_g>0°$ C.) or vice versa.

Components P1 and P2 according to the invention may be prepared in virtually any desired mixing ratio, eg. from 0.1 to 99.9% by weight of A, preferably from 10 to 90% by weight of P1 and from 0.1 to 99.9% by weight of B, preferably from 10 to 90% by weight of B.

Component P3

The formation of droplets of condensed water is termed fogging. The more nonpolar the surface, the smaller the condensed droplets and the stronger their scattering of light, with the consequence that objects behind this surface become impossible to recognize clearly or to recognize at all.

In PVC films, this effect is significantly less developed, because of the polarity of the PVC and of the plasticizer present therein. This favorable behavior is moreover improved by adding antifogging agents.

However, the usual antifogging agents are virtually ineffective with styrene polymers, such as BOPS (biaxially oriented polystyrene). These polymers are therefore provided with similar properties by dipping or coating.

In the present case, however, this would imply an additional operation. It was therefore surprising that an excellent antifogging effect was found with the novel film on addition of the usual antifogging agents.

Antifogging agents are compounds which, like soaps and emulsifiers, have polar and non-polar regions within their molecules. The non-polar radicals in the molecules generally anchor themselves in the material of the films and the polar radicals in the molecules provide an increased polarity at the film surface. This has the result of spreading the condensed droplets of water, ie. they flow, increase in size (coalesce) and finally flow into a uniform, transparent, clear film of water.

Examples of antifogging agents for the purposes of the invention are alkaline-earth metal soaps and alkali metal soaps of the formula (1a) or (1b)

$$MO_3S\text{—}C_nH_{2n+1} \qquad (1a)$$

$$MO_2C\text{—}C_nH_{2n+1} \qquad (1b)$$

(M=Na, K, Rb, Cs, NR$_4$, Ca/2, Mg/2; n=from 8 to 20; R=H, alkyl, aryl) and sorbitan fatty acid esters, polyoxyethylene-sorbitan fatty acid esters, polyoxyethylene-sorbitol esters, polyoxyethylene-sorbitol, polyoxyethylene-fatty acid esters, polyoxyethylene-fatty alcohols, mono-, di- and triglycerides of stearic, palmitic, lauric, myristic and oleic acids and their ethoxylated derivatives and of polyethylene glycol, of polypropylene glycol and of pentaerythritol, in particular mono-, di- and triesters of stearic, palmitic, lauric, myristic and oleic acids, also, if desired, mixed, and ethoxylated amines and fatty acid alcoholamides.

Component P4

Primary antioxidants are used in a concentration of from 0.1 to 3% by weight, preferably from 0.2 to 10% by weight. They can be added to the polymers in any known or usual manner, eg. in pure form directly during processing, by premixing antioxidant and unstabilized polymer granules, by premixing antioxidant and polymer in solution and removal of solvent from both (devolatilization) or as a concentrate (masterbatch).

For the purposes of the invention, primary antioxidants are any of the usual stabilizers available on the market which prevent or reduce thermally-induced free-radical attack on the polymer. They are also described as processing stabilizers and serve mainly to protect the polymer during its synthesis, work-up and processing.

They are generally and preferably sterically hindered phenols. These are compounds having a phenol structure and having alkyl substitution in the position (2,6) adjacent to the phenolic hydroxyl, alkyl in this case being preferably tert-butyl or alkyl-tert-butyl.

The following compounds are, for example, suitable and in some cases also have structural elements other than the typical phenolic structure which have a stabilizing effect by another mechanism:

α-,β- and γ-tocopherol, 2,6-dimethylphenol;
2,6-di-tert-butylphenol,
2,6-di-tert-butyl-4-methylphenol,
n-octadecyl 3-(3,5-di-tert-butyl-4-hydroxyphenyl) propionate,
tetrakis[3-(3,5-di-tert-butyl-4-hydroxyphenyl) propionyloxymethyl]methane,
2-(2-hydroxy-3-tert-butyl-5-methylbenzyl-4-methyl-6-tert-butylphenyl (meth)acrylate,
2-(3,5-di-tert-butyl-4-hydroxybenzyl)-4-methylphenyl (meth)acrylate,
2-(3,5-di-tert-butyl-4-hydroxybenzyl)-4-ethylphenyl (meth)acrylate,
2-(3,5-di-tert-butyl-4-hydroxybenzyl)phenyl (meth) acrylate,
2,6-bis(2-hydroxy-3-tert-butyl-5-methylbenzyl).

Particular preference is given to 2-(2-hydroxy-3-tert-5-methylbenzyl)-4-methyl-6-tert-butylphenyl acrylate, 2,6-di-tert-butylphenol, n-octadecyl 3-(3,5-di-tert-butyl-4-hydroxyphenyl)propionate and tocopherol.

Phenols which are unsubstituted or only monosubstituted in the ortho-position can be used only to a limited extent, since they can lead to marked yellow coloration during processing.

Mixtures of 2 or more phenolic compounds are frequently used, and these can then have a synergistic effect in protecting from oxidation.

Examples of suitable primary antioxidants are those available under the trade names Irganox 1076 and Irganox 3052 (Ciba Additives) or corresponding products of other manufacturers.

Stabilizers, such as tocopherol, which simulate natural products have equally good suitability.

Component P5

Secondary antioxidants are generally used as complements to primary antioxidants. Whereas the presence of primary antioxidants is essential, in particular during polymer preparation and processing, the use of secondary antioxidants is a matter of choice. Without these secondary antioxidants, a yellow coloration of the polymers according to the invention is frequently observed.

Examples of secondary antioxidants are:

Thiourea, distearyl thiodipropionate and, preferably, phosphorus compounds (phosphites). Organic phosphites are added in an amount of up to 5% by weight, preferably from 0.3 to 2% by weight. Particularly effective phosphites are, for example, those of the formula (RO)$_3$P, in which R are identical or different and are alkyl, alkylaryl, aryl or cycloalkyl. Examples of these are trimethyl phosphite, triphenyl phosphite, tris(nonylphenyl) phosphite, tris(2,4-dimethylphenyl) phosphite, diphenyl decyl phosphite, didecyl phenyl phosphite, phenyl di(2-ethylhexyl) phosphite, methyl diphenyl phosphite, phenyl dicyclohexyl phosphite, diisopropyl phenyl phosphite, diethyl phenyl phosphite, di(2-ethylcyclohexyl) n-butyl phosphite and 3-cyclopentylpropyl dihexyl phosphite. Preference is given to tris(nonylphenyl) phosphite (usually termed TNPP).

In a particularly preferred embodiment, the organic phosphite is itself stabilized by addition of an amine compound. In particular, triisopropanolamine is added in an amount of from 0.1 to 5% by weight based on 100% by weight of organic phosphite, and is therefore present in the copolymer only in a very small amount.

Component P6

Other additives in amounts of up to 50% by weight, preferably up to 10% by weight, may be added as component P6. Merely as examples, mention may be made of aliphatic and aromatic carboxylic and sulfonic acids.

Bis(stearoylethylenediamine), adipic esters and phthalic esters having various chain lengths, aliphatic and aliphatic-aromatic hydrocarbons (white oils, paraffins), silicone oils. Examples of other typical auxiliaries are commercially available alkylsulfonates (Hostastat; Hoechst) and quaternary ammonium salts (Mecostat and Dehydad; Merck), stearoyldiethanolamine or coconut fat diethanolamine, pigments, such as titanium dioxide, carbon black, color pigments and dyes. It is also possible to use glass fibers, carbon fibers, mineral fillers (chalk, dolomite, talc, etc.) and other fillers which are usual for the polymers mentioned and well known to the person skilled in the art.

Besides these, other additives may also be present, for example other inorganic and/or organic stabilizers, such as calcium stearate, zinc stearate, erucamide, microcrystalline hard wax (eg. Be Square from Petrolite Polymers) or mineral oil. Other materials which may also be present are: additional, non-phenolic and non-phosphitic stabilizers, W-stabilizers, HALS (hindered amine light stabilizer) compounds, benzophenone derivatives, triazole derivatives, nickel quenchers or other usual UV or light stabilizers. Certain combinations of primary antioxidants (P4), such as α-tocopherol, with UV or light stabilizers (mention is made merely as examples of Tinuvin® P from Ciba-Geigy and Lowinox® P55 from Great Lakes representing the benzotriazoles class) often result in particularly synergistic effects with respect to yellowing, core stability and long-term stability.

It is also possible to use plasticizers and lubricants, for example stearic acid, stearates, palmitates, myristates, laurate, glycerol mono-, di- and tristearates, erucic acid, erucamides, microcrystalline hard waxes, bis (stearoylethylenediamine), adipic esters and phthalic esters having various chain lengths, aliphatic and aliphatic-aromatic hydrocarbons (white oils, paraffins) and silicone oils.

Examples of other typical auxiliaries are antistats, such as alkylsulfonates (Hostastat®; Hoechst) and quaternary ammonium salts (Mecostat® and Dehydad®; Merck), stearoyldiethanolamine or coconut fat diethanolamine, pigments, such as titanium dioxide, carbon black, color pigments and dyes. It is also possible to use glass fibers, carbon fibers, mineral fillers (chalk, dolomite, talc, etc.) and other fillers which are usual for the polymers mentioned and well known to the person skilled in the art.

The mixtures according to the invention can be obtained by any usual method, eg. by joint extrusion and calendering. The extrusion can be carried out on single- or twin-screw extruders. The calendering is expediently carried out firstly in kneaders or extruders (softening) and, if desired, on mixing rolls, followed by the actual calendering process with, if desired, addition of suitable stabilizers. Blowmolding and injection molding are carried out on the usual machinery. In particular thin films in the range from 5 to 200 μm are in some cases very tough and have high resilience. Thin films are produced by cast-film, blown-film, chill-roll or other usual processes.

Films of particularly high quality are produced by coextrusion. Coextrudates may, however, also be obtained by blowmolding, for example. The coextrusion serves to give a combination of properties. The number of layers here, exactly like the number of components used, may be chosen freely from the technical possibilities available. Possible components for coextrusion here are the polymers mentioned above as mixing partners of claim 1. However, preference is given to those whose properties complement those of the elastic block copolymer in accordance with the combinations given in the claims. Thermoplastic elastomers are particularly preferred. Coextruded structures of this type may be composed of 2, 3 or more layers in any desired sequence and of any desired thickness. Coex structures may be produced with or without adhesion promoter. Preference is given to the use of component P1, alone or in a mixture with component P2, for one layer A, and any desired polymer for layer B. Examples of layer structures are:

1) layer A/layer B
2) layer A/layer B/layer A
3) layer B/layer A/layer B
4) layer A/layer B/layer A/layer B
5) layer B/layer A/layer B/layer A If a structure has more than one of layers A and B, this does not mean that the formulation of the respective layers is identical.

Preference is also given to the use of layers A and B which, respectively, have different formulations (eg. in structures 4 and 5).

The coextrusion layers B are preferably partially crystalline polymers, such as polyethylene, polypropylene, polyamide or else ethylene-vinyl acetate copolymers, ethylene-vinyl alcohol copolymers, polyesters, such as PETG (a polyethylene terephthalate copolymer, commerically available under the trade name Kodar 6761, Eastman Kodak, for example), polyethylene terephthalate or polybutylene terephthalate. Examples of structures which are particularly important industrially are those under 2) and 3) in the list above.

Particular preference is given to a composite having the structure polypropylene/thermoplastic elastomer/polypropylene (A/B/A structure, where the thermoplastic elastomer may also be used in the form of a mixture with thermoplastics). A composite of this type is a novel material and, preferably in the form of a film and in particular in the form of an extruded or chill-roll film, has very high toughness and good recovery (memory effect).

The lower the degree of orientation of the material (as a result of the high expansion ratio or high take-off speed), the more pronounced this recovery is. This composite is suitable as a substitute film for PVC. The total thickness of the composite is preferably from 100 to 2000 μm for the extruded film, and from 5 to 200 μm, preferably from 10 to 30 μm for a chill-roll or blown film, the proportion of the thermoplastic elastomer in the entire composite being, for example, from 20 to 95% by weight, preferably from 40 to 95% by weight, and in particular from 50 to 90% by weight. The middle layer B here is composed of a mixture of thermoplastic elastomer with up to 80% by weight, preferably up to 50% by weight, particularly preferably up to 30% by weight of the thermopolastic polymer. Properties similar to those described above may also be achieved with the polyethylene/thermoplastic elastomer/polyethylene composite, to which the abovementioned properties and constituent amounts apply.

Examples of other composites are: polypropylene/thermoplastic elastomer/polyethylene, polyamide/thermoplastic elastomer/polyethylene, polyamide/thermoplastic elastomer/polypropylene, PETG/thermoplastic elastomer/PETG, thermoplastic elastomer/EVA copolymer/polyethylene and, in each case, the possible mixtures with thermoplastics.

All of the composites described above may be produced with or without adhesion promoters. When thermoplastics are used, those which have proven particularly suitable are glass-clear polystyrene, impact-modified polystyrene and styrene-butadiene block copolymers, individually or in a mixture.

The mixtures (molding compositions) according to the invention are useful in producing moldings and sheeting, for example films of all types, such as chill-roll, coextruded, blown and extruded films, calendered films, milled sheets, expansion bellows, flexible bellows, mats, covers, floorcoverings, shoe soles, wall-to-wall carpet packings, artificial leather, films for automobile crash pads, tires, blood bags, storage containers for infusions, laminating films, elastic film pieces for diapers, toys, latex substitutes, etc. Mention may be made in particular of films for packaging (packaging of meat, fruit and vegetables, shrinkwrap films and sleeves).

The mixtures according to the invention can be obtained by any usual method, eg. by joint extrusion, calendering or the like. The extrusion can be carried out on single- or twin-screw extruders. The calendering is expediently carried out firstly in kneaders or extruders (softening) and, if desired, on mixing rolls, followed by the actual calendering process with, if desired, addition of suitable stabilizers. Blowmolding and injection molding are carried out on the usual machinery. In particular thin films in the range from 5 to 200 μm are, depending on the proportion of component A, very tough and have high resilience. Thin films are produced by cast-film, blown-film, chill-roll or other usual processes.

Films of particularly high quality are produced by coextrusion. Coextrudates may, however, also be obtained by blowmolding, for example. The coextrusion serves to give a combination of properties. The number of layers here, exactly like the number of components used, may be chosen freely from the technical possibilities available. Possible components for coextrusion here are the polymers mentioned above as mixing partners of claim 1. However, preference is given to those whose properties complement those of the elastic block copolymer in accordance with claims 1–11. Thermoplastic elastomers are particularly preferred. Coextruded structures of this type may be composed of 2, 3 or more layers in any desired sequence and of any desired thickness. Coex structures may be produced with or without adhesion promoter. Preference is given to the use of component P1, alone or in a mixture with component P2, for one layer A, and any desired polymer for layer B. Examples of layer structures are:

If a structure has more than one of layers A and B, this does not mean that the formulation of the respective layers is identical. Preference is also given to the use of layers A and B which, respectively, have different formulations (eg. in structures 4 and 5).

The coextrusion layers B are preferably partially crystalline polymers, such as polyethylene, polypropylene, polyamide or else ethylene-vinyl acetate copolymers, ethylene-vinyl alcohol copolymers, polyesters, such as PETG (a polyethylene terephthalate copolymer, commerically available under the trade name Kodar® 6761, Eastman Kodak, for example), polyethylene terephthalate or polybutylene terephthalate. Examples of structures which are particularly important industrially are those under nos. 2) and 3) in the list above.

Particular preference is given to a composite having the structure polypropylene/thermoplastic elastomer/polypropylene (A/B/A structure, where the thermoplastic elastomer may also be used in the form of a mixture with thermoplastics).

The novel composite, preferably in the form of a film and in particular in the form of an extruded or chill-roll film, has very high toughness and good recovery (memory effect). The lower the degree of orientation of the material (as a result of the high expansion ratio or high take-off speed), the more pronounced this recovery is. This composite is suitable as a substitute film for PVC. The total thickness of the composite is preferably from 0.1 to 2 mm for the extruded film, and from 0.05 to 0.2 mm, preferably from 0.1 to 0.30 mm for a chill-roll or blown film, the proportion of the thermoplastic elastomer in the entire composite being, for example, from 20 to 95% by weight, preferably from 40 to 95% by weight, and in particular from 50 to 90% by weight. The middle layer B here is composed of a mixture of thermoplastic elastomer with up to 80% by weight, preferably up to 50% by weight, particularly preferably up to 30% by weight of the thermpolastic polymer. Properties similar to those described above may also be achieved with the polyethylene/thermoplastic elastomer/polyethylene composite, to which the abovementioned properties and constituent amounts apply.

Examples of other composites are: polypropylene/thermoplastic elastomer/polyethylene, polyamide/thermoplastic elastomer/polyethylene, polyamide/thermoplastic elastomer/polypropylene, PETG/thermoplastic elastomer/PETG, thermoplastic elastomer/EVA copolymer/polyethylene and, in each case, the possible mixtures with thermoplastics.

All of the composites described above may be produced with or without adhesion promoters. When thermoplastics are used, those which have proven particularly suitable are glass-clear polystyrene, impact-modified polystyrene and styrene-butadiene block copolymers, individually or in a mixture.

The mixtures (molding compositions) according to the invention are useful in producing moldings and sheeting, for example films of all types, such as chill-roll, coextruded, blown and extruded films, calendered films, milled sheets, expansion bellows, flexible bellows, mats, covers, floorcoverings, shoe soles, wall-to-wall carpet packings, artificial leather, films for automobile crash pads, tires, blood bags, storage containers for infusions, laminating films, elastic film pieces for diapers, toys, latex substitutes, etc.

Mention may be made in particular of films for packaging (packaging of meat, fruit and vegetables, shrinkwrap films and sleeves).

These may be produced by suitable processes, such as mono- and coextrusion of blown films, chill-roll films and extruded films; by calendering, injection molding, blowmolding and other suitable processes not mentioned here.

EXAMPLES

A thermoplastic block copolymer according to the invention was prepared in the following manner for use as component P1:

heatable and coolable 50 l stainless steel reactor with cross-blade stirrer was prepared by flushing with nitrogen and scalding with a solution of sec-butyllithium and 1,1-diphenylethylene in cyclohexane (molar ratio 1:1) and drying. The reactor was filled with 22.8 l of cyclohexane and 42 ml of sec-butyllithium as initiator, 65.8 ml of tetrahydrofuran and the amounts of styrene (S) and butadiene (B) shown in Table 1 below were added according to the time cycle program given. The data given are the duration t in minutes of the polymerization and the starting and final temperatures $T_A$ and $T_E$, respectively (in ° C.), and it should be pointed out that the duration of the polymerization was always large when compared with the duration of the monomer feed. 0.5% of the abovementioned commercial product Irganox 3052 (P4) and 0.85% of trisnonylphenyl phosphite (P5) were added as antioxidants.

TABLE 1

| t [min] | 30 | 17 | 12 | 6 | 14 |
|---|---|---|---|---|---|
| S [g] | 1008 | 1412 | 1412 | 1412 | 1008 |
| B [g] | — | 1120 | 1120 | 1120 | — |
| $T_A$ [° C.] | 30 | 68 | 60 | 64 | 70 |
| $T_E$ [° C.] | 70 | 96 | 84 | 83 | 76 |

In each case, the polymer solution obtained was freed from solvent, mixed with 0.5% of a lubricant (microcrystalline hard wax BeSquare 195; Petrolite) devolatilized in a kneader (ZSK 30; Werner & Pfleiderer) and diced.

The films were given the same thickness of 0.016 mm (16 μm), whatever the film type.

Component P2-1: Polystyrene (polystyrene 144 C; BASF). Component P2-2: Styrene-butadiene block copolymer (Styrolux 684 D); Component P2-3: Ethylene-vinyl acetate copolymer having 8% of vinyl acetate; melt volume index $MVI_{(190° C./2.16 kg)}=4$ [g/10 min) Component P3: Glycerol monooleate Component P4:—see above Component P5:—see above

TABLE 2

| Example | Experimental results | | | | | |
|---|---|---|---|---|---|---|
| | 1 | 2 | 3 | 4 | C1 | C2 |
| P1 | 83.7 | 83.7 | 50.0 | 40.5 | 98.2 | 84.1 |
| P2-1 | 13.8 | 6.9 | 8.8 | 8.8. | 0 | 6.9 |
| P2-2 | 0 | 6.9 | 39.2 | 49.0 | 0 | 6.9 |
| P3 | 1 | 1 | 1 | 1 | 0 | 1 |
| P4 | 0.4 | 0.4 | 0.3 | 0.2 | 0.5 | 0.4 |
| P5 | 0.7 | 0.7 | 0.4 | 0.3 | 0.8 | 0.7 |
| P6 | 0.4 | 0.4 | 0.3 | 0.2 | 0.5 | 0 |
| Transparency[1] | 86 | 86 | 83 | 83 | 88 | 86 |
| Antifogging effect[2] | 2 | 2 | 2 | 2 | 5 | 2 |
| Dart drop[3] [g] | 700 | 720 | 635 | 540 | 720 | 700 |
| Shrinkage[4] [%] | 3 | 1.5 | 1.5 | 1.5 | 6 | 1.5 |
| Blocking tendency | no | no | no | no | no | yes |

[1] Thickness 2 mm
[2] 5 = none; 1 = very good
[3] determined according to ASTM-D 1709
[4] storage at 25° C. for 1 month

We claim:

1. A film in roll form, comprising
P1: is from 15 to 83.7% by weight of an elastomeric block copolymer P1 made from at least one block S which forms a hard phase and incorporates units of a vinylaromatic monomer, and at least one elastomeric block B/S which forms a soft phase and incorporates both units of a vinylaromatic monomer (S) and of a diene (B), where S is the vinylaromatic block and B/S is the soft phase, wherein
the block is built up randomly from diene units and vinylaromatic units, and where the glass transition temperature $T_g$ of the block S is above 25° C. and that of the block B/S is below 25° C. and the phase volume ratio of block S to block B/S is selected so that the proportion of hard phase in the entire block copolymer is from 1 to 40% by volume and the proportion of the diene is less than 50% by weight, based on P1,
P2: is from 13.8 to 57.8% of a thermoplastic polymer P2,
P3: is from 0.1 to 10% of an antifogging agent P3,
P4: is from 0.1 to 5% of a primary antioxidant P4,
P5: is from 0.1 to 5% of a secondary antioxidant P5; and
P6: is from 0.1 to 50% of other auxiliaries.

2. The film of claim 1, wherein the roll of film shrinks perpendicularly to the direction of take-off by not more than 3% during a storage period of three months.

3. The film of claim 1, comprising the following proportions by weight of P1 to P6:
P1: from 30 to 90%,
P2: from 30 to 90%,
P3: from 0.5 to 5%,
P4: from 0.5 to 5%,
P5: from 0.5 to 5%,
P6: 0.5 to 25%.

4. The film of claim 1, comprising in the soft phase P1, a random block copolymer based on styrene and butadiene.

5. The film of claim 1, comprising, as thermoplastic polymer P2, a styrene homopolymer, an impact-modified styrene homopolymer or a styrene-butadiene block copolymer having a glass transition temperature $T_g$ above 25° C.

6. The film of claim 1, wherein polymerization of the soft phase takes place in the presence of a polar cosolvent.

7. The film of claim 1, containing a block copolymer P1 represented by one or more of the formulae (1) to (12)
(1) S-B/S—S;
(2) $(S-B/S)_n$;
(3) $(S-B/S)_n$-S;
(4) $B/S-(S-B/S)_n$;
(5) $X-[(S-B/S)_n]_m+1$;
(6) $X-[(B/S—S)_n]_m+1$;
(7) $X-[(S-B/S)_n-S]_m+1$;
(8) $X-[(B/S—S)_n-B/S]_m+1$;
(9) $Y-[(S-B/S)_n]_m+1$;
(10) $Y-[(B/S—S)_n]_m+1$;
(11) $Y-[(S-B/S)_n-S]_m+1$;
(12) $Y-[(B/S—S)_n-B/S]_m+1$;
where X is the radical of an n-functional initiator, Y is the radical of an m-functional coupling agent and m and n are natural numbers from 1 to 10.

8. The film of claim 1, comprising a block copolymer having one of the formulae $X-[-B/S—S]_2$ and $Y-[-B/S—S]_2$.

9. A coextrudate made from at least two layers of any desired thickness, wherein at least one layer is composed of the film defined in claim 1 and at least one layer is composed of a partially crystalline polymer or of a polymer which is processable as a thermoplastic.

10. The coextrudate defined in claim 9, wherein the layer structure is P1/P2/P1 or P2/P1/P2, where P2 is selected from the group consisting of polyethylene, polypropylene, polyethylene terephthalate, polybutylene terephthalate and polyamide.

11. A process for producing the film of claim 1, by extruding an appropriate molding composition.

12. The film of claim 1, wherein the elastomeric block B/S of P1 is divided into subblocks
$(B/S)_1-(B/S)_2$;
$(B/S)_1-(B/S)_2-(B/S)_1$; or
$(B/S)_1-(B/S)_2-(BIS)_3$,
where the indices 1, 2 and 3 indicate different vinylaromatic compound/diene (S/B) ratios of the individual blocks B/S, and wherein the glass transition temperature $T_g$ of each subblock is <25° C.

* * * * *